United States Patent
Ramirez, Jr. et al.

(10) Patent No.: US 10,707,721 B2
(45) Date of Patent: Jul. 7, 2020

(54) DUAL COMPARTMENT GEAR MOTOR ASSEMBLY

(71) Applicant: Molon Motor and Coil Corporation, Arlington Heights, IL (US)

(72) Inventors: Emilio A. Ramirez, Jr., Roselle, IL (US); Shay Shalmon, Chicago, IL (US)

(73) Assignee: MOLON MOTOR AND COIL CORPORATION, Arlington Heights, IL (US)

( * ) Notice: Subject to any disclaimer, the term of this patent is extended or adjusted under 35 U.S.C. 154(b) by 416 days.

(21) Appl. No.: 15/629,380

(22) Filed: Jun. 21, 2017

(65) Prior Publication Data
US 2017/0373558 A1    Dec. 28, 2017

Related U.S. Application Data

(60) Provisional application No. 62/353,845, filed on Jun. 23, 2016.

(51) Int. Cl.
*H02K 5/22* (2006.01)
*F16H 57/02* (2012.01)
*H02K 7/116* (2006.01)
*H02K 11/33* (2016.01)

(52) U.S. Cl.
CPC ............... *H02K 5/22* (2013.01); *F16H 57/02* (2013.01); *H02K 7/116* (2013.01); *H02K 11/33* (2016.01); *F16H 2057/02034* (2013.01)

(58) Field of Classification Search
CPC .......... H02K 5/22; H02K 11/33; H02K 7/116; F16H 57/02; F16H 2057/02034
See application file for complete search history.

(56) References Cited

U.S. PATENT DOCUMENTS

| | | | | |
|---|---|---|---|---|
| 3,851,533 A | * | 12/1974 | Dehler | F16H 1/16 74/89 |
| 4,877,926 A | * | 10/1989 | Yamase | B60H 1/00685 200/19.01 |
| 5,446,326 A | * | 8/1995 | Scheider | H02K 7/116 310/68 R |
| 5,768,900 A | * | 6/1998 | Lee | F25C 1/04 62/137 |
| 8,201,478 B2 | | 6/2012 | Ramirez, Jr. et al. | |
| 2002/0008491 A1 | * | 1/2002 | Aoshima | H02K 7/116 318/696 |
| 2003/0011330 A1 | * | 1/2003 | Machalek | G07F 11/16 318/15 |
| 2011/0239798 A1 | * | 10/2011 | Ramirez, Jr. | F16H 57/039 74/412 R |

(Continued)

*Primary Examiner* — Mohamad A Musleh
(74) *Attorney, Agent, or Firm* — Oliff PLC; R. Brian Drozd (57) ABSTRACT

The present invention relates to a compact, dual compartment gear motor assembly for use primarily in operating appliances and/or components of appliances. The compact nature of the dual compartment gear motor assembly makes it useful in many residential and commercial appliances, including ice making machines, automatic dishwashing machines, laundry machines and vending machines. The dual compartment configuration separates a gear train assembly and motor into a housing compartment separate from a power source, such as printed circuit board or control board, and further secures the gear motor assembly components within the housing compartments without the need for fasteners.

20 Claims, 4 Drawing Sheets

(56) References Cited

U.S. PATENT DOCUMENTS

| | | | |
|---|---|---|---|
| 2011/0265594 A1* | 11/2011 | Ramirez, Jr. | F16H 57/039 74/416 |
| 2014/0209781 A1* | 7/2014 | Weber | F16F 15/06 248/560 |
| 2015/0075311 A1* | 3/2015 | Kanzaki | F16H 57/02 74/421 A |

* cited by examiner

DUAL COMPARTMENT GEAR MOTOR ASSEMBLY

This application claims priority to U.S. Provisional Application Ser. No. 62/353,845 filed Jun. 23, 2016, which is incorporated in its entirety herein.

TECHNICAL FIELD

The present disclosure relates generally to a gear motor assembly. In particular, the present disclosure relates to a dual compartment, compact gear motor assembly wherein the components of the assembly, including the gear train assembly and motor are separately housed from the control board, in a dual compartment housing. The compact nature of the present gear motor assembly makes it useful in many residential and commercial appliances, including ice making machines, automatic dishwashing machines, laundry machines, vending machines and valve actuator machines.

BACKGROUND

It is, of course, generally known to use a gear motor assembly, including a compact gear box containing a motor, such as a direct current (DC) motor to drive a gear train assembly, in both residential and commercial appliances. Some of these appliances include ice making and dispensing machines, laundry machines, dishwashing machines, vending machines and valve actuator machines. Because of the small space generally associated with these appliances, the size and configuration of the gear motor assembly is important; however, there still needs to be sufficient space within the gear box housing to accommodate the gear train assembly, with its multiple gears, as well as the source of power. Additionally, ease in manufacturing gear motor assemblies without the need to use screws or other fasteners that are prone to loosening during use is another desired feature of the present assembly.

A need, therefore, exists for an improved compact gear motor assembly. Specifically, a need exists for improved gear motor assembly that provides a compact arrangement useful in a variety of appliances having limited interior space, while offering ease of manufacturing and options for gear train assembly configurations.

Further, a need exists for an improved compact gear motor assembly having a dual compartment housing for accommodating gear train assembly configurations separate from control boards, including printed circuit boards.

Moreover, a need exists for an improved compact gear motor assembly having a dual compartment housing, wherein a separate compartment is spacious to accommodate options of simple to complex circuitry.

A need further exists for an improved compact gear motor assembly having a dual compartment housing, wherein the compartments include a plurality of interior partition walls and/or ribs to secure the components within the housing without the need for screws or other fasteners, which can otherwise loosen during operation.

SUMMARY

The present disclosure relates to a dual compartment, compact gear motor assembly wherein the components of the gear motor assembly, including the gear train assembly and motor are housed separately from the motor control components, including a printed circuit board, in a dual compartment housing. The compact nature of the present gear motor assembly makes it useful in many residential and commercial appliances, including ice making machines, automatic dishwashing machines, laundry machines, vending machines and valve actuator machines, all of which have generally limited interior space for accommodating the gear motor assembly. Additionally, the use of a dual compartment housing provides various options concerning arrangement of the gear train assembly, as well as options relating to the use of simple to complex circuitry.

To this end, in an embodiment of the present invention, a compact gear motor assembly is provided. The compact gear motor assembly comprises a housing having a first compartment and a second compartment, a gear train assembly positioned within the first compartment of the housing, a direct current motor connected to the gear train and positioned within the first compartment of the housing, and a power source electrically connected to the motor, wherein the power source is positioned within the second compartment of the housing separate from the gear train assembly and motor combination positioned within the first compartment of the housing.

In an embodiment of the compact gear motor assembly of the present disclosure, the first compartment includes a plurality of partition walls within an interior thereof, the partition walls forming receptacles for receiving the gear train assembly and motor.

In an embodiment of the compact gear motor assembly of the present disclosure, the second compartment includes a plurality of partition walls within an interior thereof, the partition walls forming receptacles for receiving the power source.

In another embodiment of the present invention, a dual compartment compact gear motor assembly is provided. The dual compartment compact gear motor assembly comprises dual compartment compact gear motor assembly comprises a housing comprising a cover and a base, the housing having a first compartment enclosure and a second compartment enclosure disposed between the cover and the base, a plurality of partition walls arranged within the first compartment enclosure, a plurality of partition walls arranged within the second compartment enclosure, a gear train assembly positioned within the partition walls of the first compartment enclosure of the housing, a direct current motor connected to the gear train and positioned within the partition walls of the first compartment enclosure of the housing, a power source electrically connected to the motor, wherein the power source is positioned within the plurality of the second compartment enclosure of the housing separate from the gear train assembly and motor combination positioned within the first compartment enclosure of the housing.

It is, therefore, an advantage and objective of the present disclosure to provide a compact, dual compartment gear motor assembly for use in a residential or commercial appliance where internal space for components is at a premium.

It is yet another advantage and objective of the present disclosure to provide a compact, dual compartment gear motor assembly wherein the gear train assembly is housed in a compartment separate from the power source.

Moreover, it is an advantage and objective of the present disclosure to provide a compact, dual compartment gear motor assembly, wherein each compartment includes a plurality of inner separating ribs or partition walls within each compartment creating enclosures for separating and securing the components of the gear motor assembly within each compartment.

It is yet another advantage and objective of the present disclosure to provide a compact, dual compartment gear motor assembly, wherein the gear train is contained within one of the compartments without of the use of conventional fasteners.

It is a further advantage and objective of the present disclosure to provide a compact, dual compartment gear motor assembly, wherein a direct current motor can be contained within one of the compartments without the use of conventional fasteners.

It is another advantage and objective of the present disclosure to provide a compact, dual compartment gear motor assembly, wherein the power source can be contained within one of the compartments without the use of conventional fasteners.

It is yet a further advantage and objective of the present disclosure to provide a compact, dual compartment gear motor assembly wherein the dual compartment housing provides for a compact arrangement of the gear train assembly and motor.

Another advantage of the present assembly is to provide ease in manufacturing because the dual compartments allow for easy customization of the power components, from simple to complex circuitry.

Additional features and advantages of the present invention are described in, and will be apparent from, the detailed description of the presently preferred embodiments and from the drawings.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 3 illustrates a top perspective view of each of the dual compartments of the compact, dual compartment gear motor assembly of the present disclosure, wherein

DETAILED DESCRIPTION

The present invention relates to a compact, gear motor assembly 10 for use primarily in operation of appliances. The compact nature of the present gear motor assembly 10 makes it useful in many residential and commercial appliances generally having limited space for such components, including ice making machines, automatic dishwashing machines, laundry machines, vending machines and valve actuator machines. For example, the present gear motor assembly 10 may be useful in a refrigerator/freezer to dispense water and ice, including providing options to dispense ice cubes and crushed ice. However, the potential applications of the present gear motor assembly 10 are broader than for water and ice dispensers and is not limited to such.

Notably, the compact gear motor assembly 10 of the present disclosure includes dual compartments within the housing of the assembly. The dual compartment feature provides a compact arrangement while separating the gear train assembly 40 and motor 42 from the motor power source, such as a printed circuit board 50 or control board.

Figure 1:
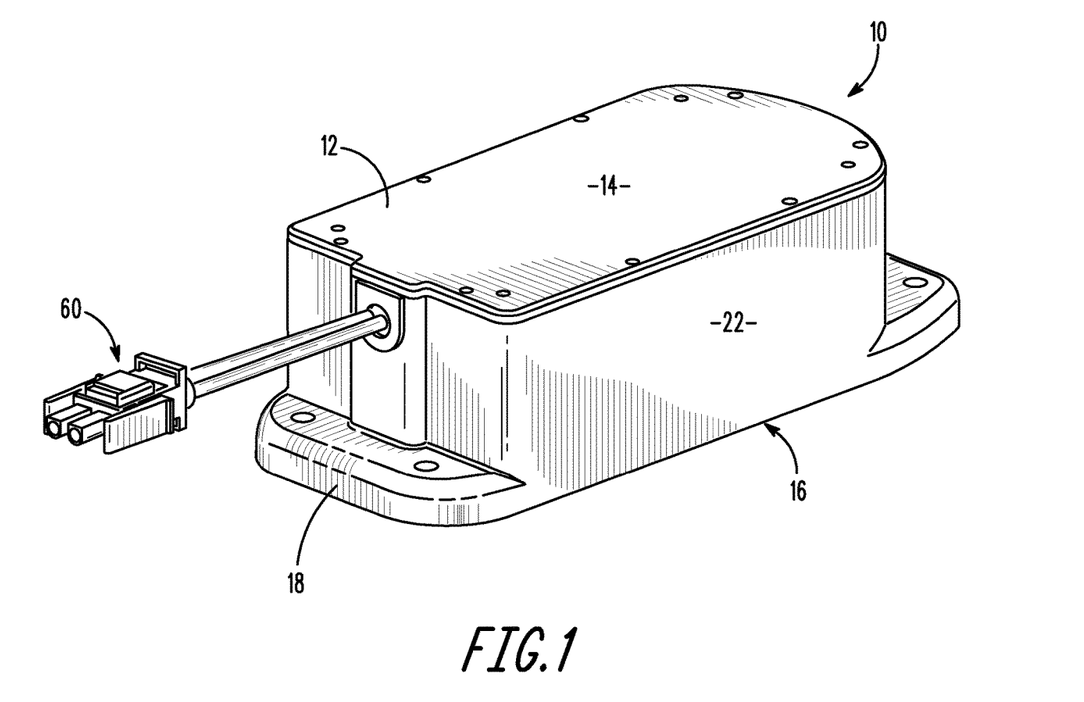
FIG. 1 illustrates a perspective view of a compact, dual compartment gear motor assembly in accordance with the present disclosure.
Figure 2:
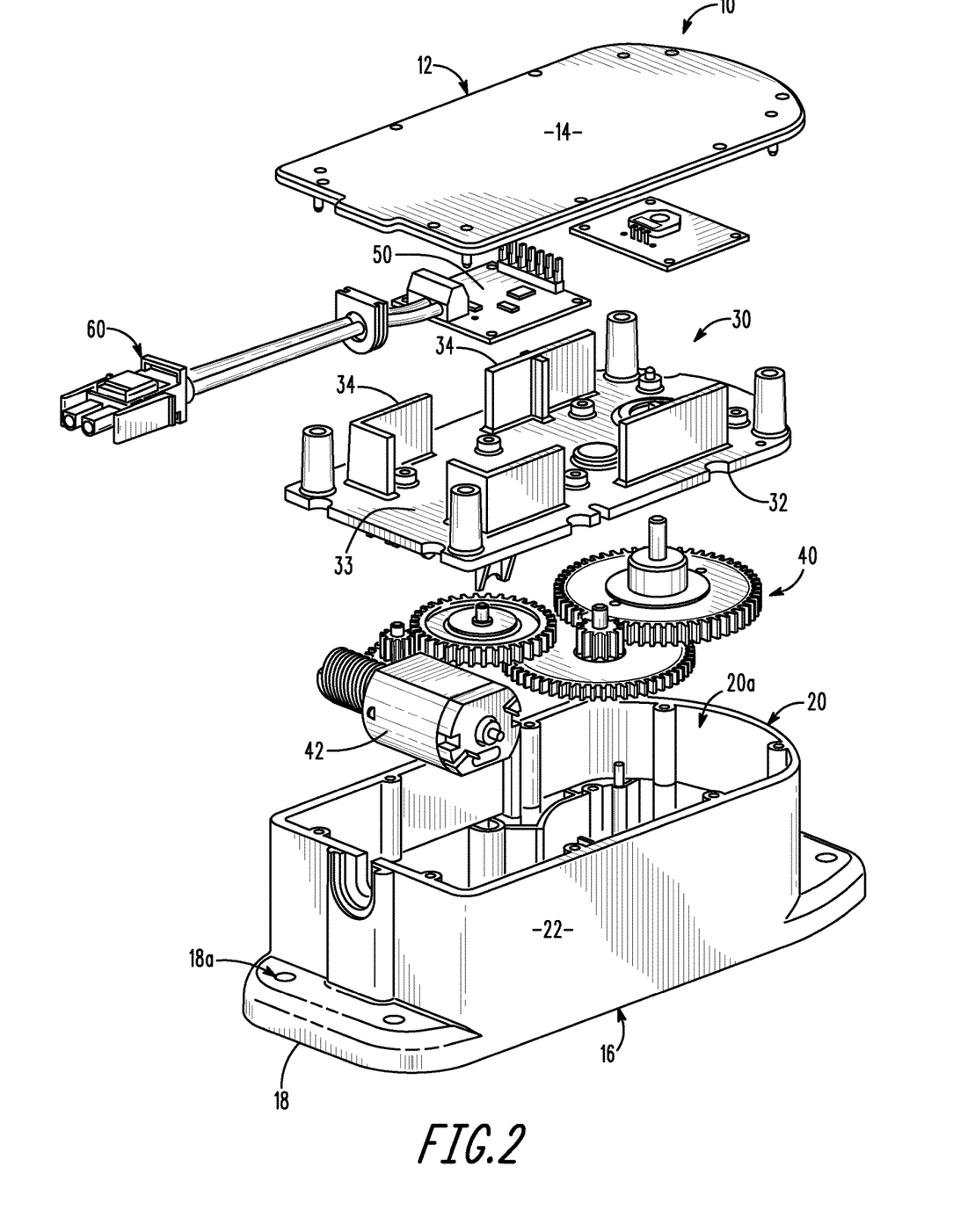
FIG. 2 illustrates an exploded view of a compact, dual compartment gear motor assembly in accordance with the present disclosure.

Now referring to the figures, wherein like numerals refer to like parts, FIGS. 1 and 2 illustrate an exemplary embodiment of a compact, dual compartment gear motor assembly 10 for use in an appliance, or in a component for an appliance, such as the ice maker/dispenser in a refrigerator. The compact gear motor assembly 10 includes a closed housing or gear box 12 having a cover 14 and a base 16. The base 16 further includes mounting extensions 18, with apertures 18a for receiving appropriate fasteners (not shown). The housing 12, including the cover 14 and the base 16 are typically constructed from plastic; however, it should be understood that any suitable material can be used, including metal. The cover 14 and base 16 are attached together by preferably by ultrasonic welding to prevent liquids, including water and humidity from entering the compartments, and potentially effecting the components of the gear motor assembly within the housing 12. The cover 14 and base 16 may be secured together using alternative suitable means, including adhesives, screws, fasteners, snap-fit structures, etc., which may either permanently or removably secure the cover and base together.

The present gear box assembly 10 includes mounting extensions 18 for mounting the gear box assembly, for example, inside of an ice-making compartment of a refrigerator or freezer. The mounting extensions 18 further include apertures 18a for receiving a suitable fastener (not shown). It should be understood that although one embodiment is shown, there are numerous mounting options depending on a particular application for the gear motor assembly.

Figure 3A:
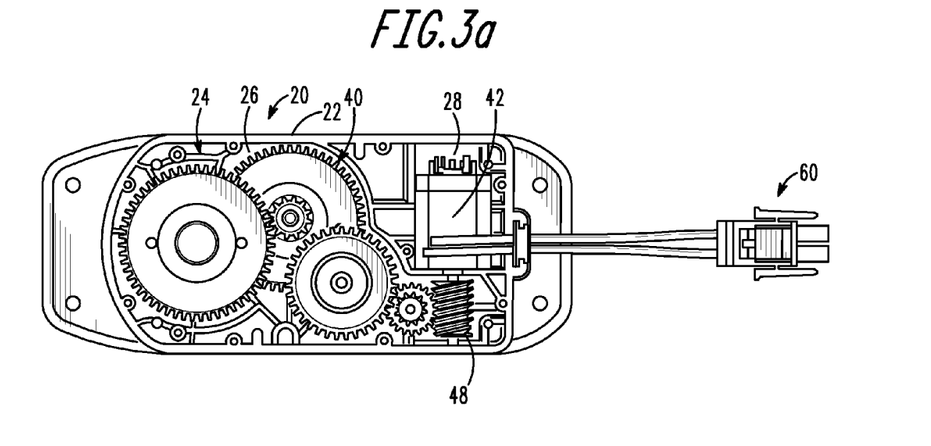
FIG. 3a shows a top view of the first compartment and FIG. 3b shows a top view of the second compartment; and, FIG. 4 illustrates a perspective view of a gear train assembly arrangement used in the compact, dual compartment gear motor assembly of the present disclosure.
Figure 3B:
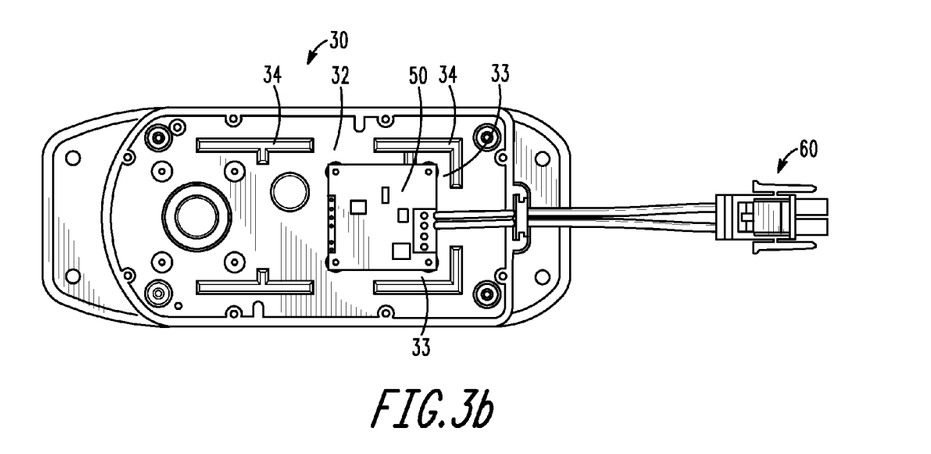

As discussed, FIG. 2 shows an exploded view of the present gear motor assembly 10, particularly, an exploded view of the housing 12. Notably, the housing 12 is internally divided into two compartments—a first compartment 20 and a second compartment 30. FIG. 3 shows a top perspective view of each of the first compartment 20 (FIG. 3a) and the second compartment 30 (FIG. 3b). An advantage of the present dual compartment housing is that one compartment 20 is designed to hold the gear train assembly 40 and associated motor 42, while the second compartment 30 is designed to hold the power source 50 for the motor, all in a compact arrangement, while permitting easy manufacturing and customization of the assembly.

Referring to FIGS. 2 and 3, the first compartment 20 is an enclosure formed by an outer wall 22 extending around the perimeter of the base 16. Specifically, as shown in FIG. 3, the outer wall 22 extends to the two opposing outer perimeter edges of the base 16, and up to the mounting extensions 18. The height of the outer wall can be any height suitable for enclosing the gear train assembly 40 and motor 42, while maintaining a compact profile of the housing 12, and depending on the particular application. Thus, an advantage of the housing 12 having separate compartments is that it permits customization of the assembly 10.

The first compartment 14 is an enclosure designed for receiving and securing the gear train assembly 40 and motor 42, typically a DC motor. In the structural arrangement of the present disclosure, the motor 42 is positioned and secured within the first compartment 20 without the need for fasteners, such as screws to hold the motor in place. This is an advantage of the present disclosure, because securing the gear train assembly 10 without fasteners avoids any potential issues that may arise if the fasteners, and thus the gear train assembly, become loose during use of the motor assembly.

Specifically, as shown in FIG. 3a, the inside or inner section 20a of the first compartment enclosure 20 further includes a plurality of separating inner ribs or partition walls 24. The formation of the inner ribs or partition walls 24 create receptacles within the compartment 20 for holding the gear train assembly 40 and the motor 42 in position. Specifically, and in this particular embodiment, the partition walls 24 separate the first compartment 20 into a gear train holding receptacle 26, and a motor holding receptacle 28. The securing receptacles 26, 28 surround and hold the gear train and motor, respectively, without the need for conventional fasteners. Conventional fasteners, such as screws, can fail during operation of a gear motor assembly due to the vibrations experienced during normal operation of an appliance, like a washing machine. The present assembly avoids this potential issue.

The inner partition walls 24 in the first compartment enclosure 20 are arranged to follow the outer contours of the gear train assembly 40 and the motor 42, respectively, to form the separate securing receptacles, 26, 28. In this manner, the gear train assembly 40 and the motor 42 can be secured within the interior of the first compartment 20 within the respective securing receptacles 26, 28, without the need for additional fasteners, such as screws.

Referring now to FIG. 3b, there is shown a top perspective view of the second compartment 30 of the housing 12 with the cover 14 of the housing 12 removed. The second compartment 30 is formed between the cover 14 of the housing 12 and an intermediate base 32 (FIG. 2). When the housing 12 and all of the components are assembled within the housing, the intermediate base 32 is sandwiched between and the gear train 40 and the power source 50, essentially separating the first compartment 20 of the housing from the second compartment 30.

The second compartment 30 is designed to house a power source 50 for the motor 42, such as a printed circuit board (PCB) 50 or other control board. In the present embodiment, the PCB 50 is electrically connected to the motor 42 thereby permitting electrical power to be applied to the motor. An advantage of having a second compartment 30 separate from the first compartment 20, is that the second compartment is dedicated to receiving the power source and thus is spacious enough to accommodate options relating to the power source, from simple to complex circuitry depending on a particular application, to drive the motor.

Similar to the first compartment 20 and as shown in FIG. 3b, the second compartment 30 also includes a plurality of partition walls 34 located on the intermediate base 32. The partition walls 34 in the second compartment 30 can surround the printed circuit board 50 forming a securing receptacle 33, and assist in securing it within the compartment 30 without the need to use conventional fasteners. Partition walls 34 can be arranged to accommodate the specific circuitry, from simple to complex, as desired in various applications.

Figure 4:
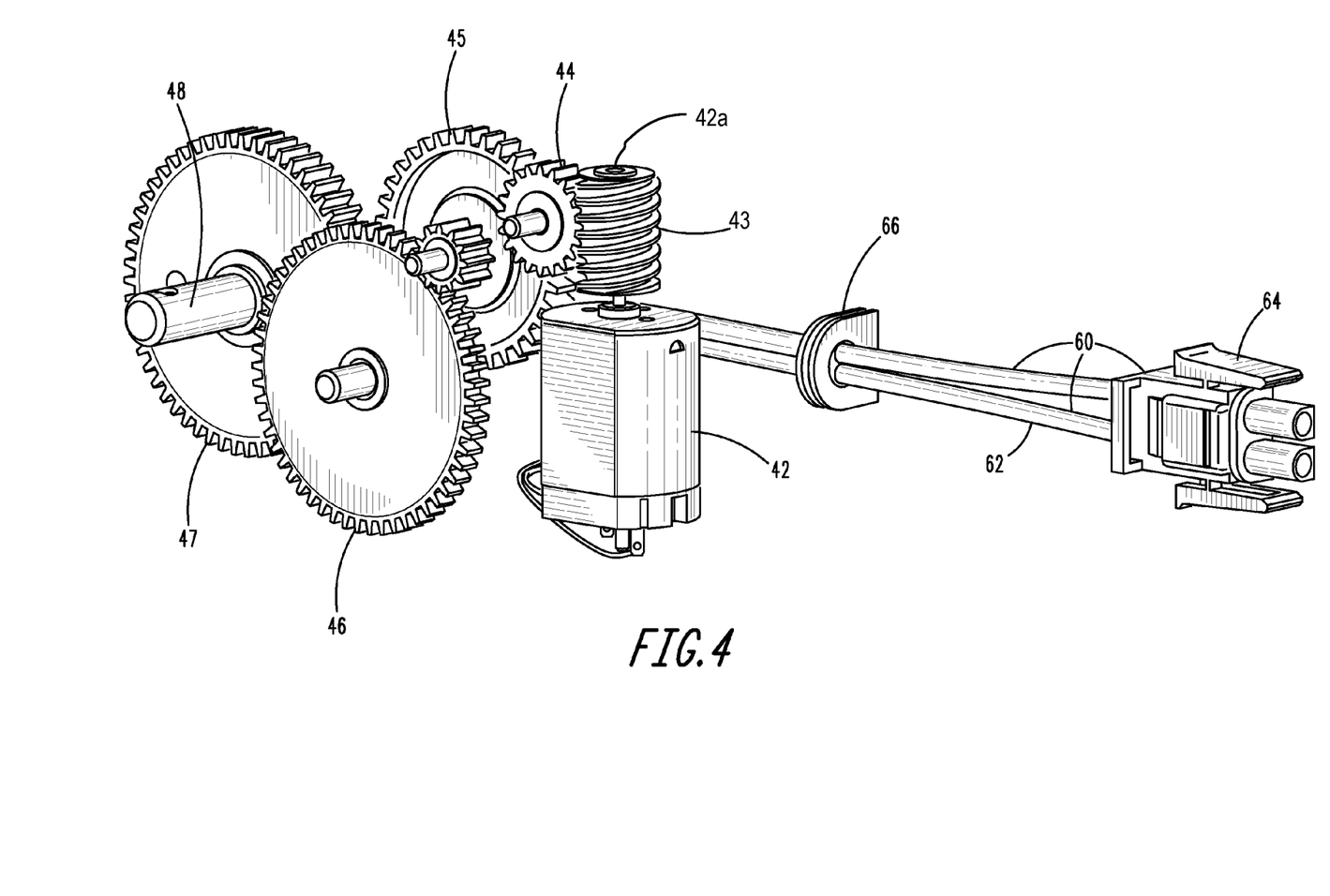

FIG. 4 illustrates a typical gear train assembly 30 useful in the present assembly 10. As is known, the gear train assembly 40 comprises a series of gears, including the following: an input worm gear 43, which engages with the motor 42 in a right angle position, a first stage cluster gear 44, a second stage cluster gear 45, a third stage cluster gear 46 and an output gear 47, which is further connected to an output drive shaft 48. The right angle configuration of the motor 42 to the gear train assembly 30 provides an improved compact arrangement while offering back drivability, which also guarantees precise positioning of the output shaft 48. The motor 42 is a standard direct current (DC) motor capable of rotating its motor shaft 42a in both clockwise and counter-clockwise directions.

Operation of the present gear train 40, will now be further described. Although a specific description of the multiple gears are described herein, it should be understood that the number of gears and the arrangement of the particular gear train can be modified depending on a specific requirement or application. When the motor 42 is activated by the power source 50, the motor through its shaft 42a connects initially to and rotates the input worm gear (first gear) 43. The motor 42 and input worm gear 43 sequentially drive the plurality of cluster gears comprising the gear train assembly 40. More specifically, the worm gear 43 engages with outer teeth of the first stage cluster gear 44, which rotates about a gear pin. The outer teeth of the first stage cluster gear 44 engage with outer teeth of the second stage cluster gear 45, which rotates about a gear pin. The inner teeth of the second stage cluster gear 45 engage with outer teeth of the third stage cluster gear 46, which rotates about a gear pin. The inner teeth of the third stage cluster gear 46 engage with teeth of an output gear (fifth gear) 47. The output shaft 48 is carried by the output gear 47 and rotates along with the output gear.

The gear train 30 driven by the motor 42 is designed to provide low rotational speed and high torque to the output shaft 36. The low speed, high torque rotation of the output shaft 48 can be beneficial for driving an appliance, such as an ice dispenser to crush ice and dispense the crushed ice or to dispense ice cubes, or other applications such as vending machines and valve actuators. The motor 42 is operated in two directions, clockwise and counter-clockwise. One direction of the motor 42, such as a counter-clockwise direction, operates the output shaft 48 in one direction to provide the function of dispensing ice cubes, for example. The other opposite direction of the motor 42, such as clockwise, operates the output shaft 48 in its opposite direction to provide the function of crushing ice and dispensing the crushed ice, for example, or going back to its home position, as in opening and closing of a valve.

FIG. 4 also illustrates an electrical assembly 60 including lead wires 62 and a connector 64. The lead wires 42 are connected to electrical components inside of the housing 12 and extend outward from the housing through a rubber sealing grommet 66, which further seals the motor 42 from moisture. Use of the rubber sealing grommet 66 assists in maintaining the hermetic seal of the housing 12. Through the connector 64, the electrical assembly 60 and the gear motor assembly 10 can be connected to a control circuit of an appliance (not shown), for example, an ice dispenser of a refrigerator or freezer, or vending machines or valve actuators.

The dual compartment arrangement of the present gear motor assembly provides options for designing the present gear motor assembly 10 for use in different applications, because the dual compartments 20, 30 permit customization of the power source and gear train arrangement. Therefore, certain appliances requiring stronger motors and more power, for example can be accommodated with the present assembly 10 in view of the dual compartments and separation of the power source from the gear train and motor assembly. Additionally, the dual compartment configuration provides a compact arrangement for the gear train assembly. The compact assembly of the present gear motor assembly 10 allows the assembly to be located in a small space inside of refrigerator/freezer, for example. Because the present assembly 10 requires less space inside of the particular appliance, there is a great amount of space available for other components. For example, the ice receptacle inside the freezer can be larger and contain more ice because the present gear motor assembly 10 is smaller and takes up less valuable space.

Notably, an additional advantage of the dual compartment arrangement and the securing receptacles formed from the partition walls provided therein, is that the partition walls and receptacles are useful for securing the power source and the gear train assembly and motor without the need for conventional fasteners. This not only provides ease in manufacturing and customization of the present gear motor assembly, but it also avoids repairs that are often required when traditional fasteners loosen, causing the gear train assembly and motor to loosen within the housing.

It should be noted that various changes and modifications to the presently preferred embodiments described herein will be apparent to those skilled in the art. Such changes and modifications may be made without departing from the spirit and scope of the present invention and without diminishing its attendant advantages. Further, references throughout the specification to "the invention" are nonlimiting, and it should be noted that claim limitations presented herein are not meant to describe the invention as a whole. Moreover, the invention illustratively disclosed herein suitably may be practiced in the absence of any element which is not specifically disclosed herein.

We claim:

1. A compact gear motor assembly comprising:
   a housing having a first compartment and a second compartment;
   a gear train assembly positioned within the first compartment of the housing;
   a direct current motor connected to the gear train and positioned within the first compartment of the housing; and,
   a power source electrically connected to the motor, wherein the power source is positioned within the second compartment of the housing separate from the gear train assembly and motor combination positioned within the first compartment of the housing,
   wherein the second compartment comprises an intermediate base and a plurality of partition walls disposed on the base forming an enclosure.

2. The compact gear motor assembly of claim 1, wherein the housing has a base and an outer wall extending around a perimeter of the base forming an enclosure of the first compartment.

3. The compact gear motor assembly of claim 2, wherein the first compartment is adapted for receiving the gear train assembly.

4. The compact gear motor assembly of claim 2, wherein the first compartment is adapted for receiving the motor.

5. The compact gear motor assembly of claim 2, wherein the first compartment includes a plurality of partition walls disposed on an interior surface of the base.

6. The compact gear motor assembly of claim 5, wherein the partition walls form a plurality of receptacles within the first compartment.

7. The compact gear motor assembly of claim 6, wherein the receptacles secure the gear train and motor within the first compartment.

8. The gear motor assembly of claim 6, wherein the gear train is positioned within one receptacle of the first compartment and the motor is positioned within a second receptacle of the first compartment.

9. The compact gear motor assembly of claim 8, wherein the motor is positioned at a right angle to the gear train.

10. The compact gear motor assembly of claim 7 wherein the gear train and motor are secured within the receptacles of the first compartment without fasteners.

11. The compact gear motor assembly of claim 1, wherein the power source is positioned within the partition walls and enclosure of the second compartment.

12. The compact gear motor assembly of claim 11, wherein the partition walls secure the power source within the enclosure of the second compartment without fasteners.

13. The compact gear motor assembly of claim 1, wherein the intermediate base separates the first compartment from the second compartment.

14. A dual compartment compact gear motor assembly comprising:
    a housing comprising a cover and a base, the housing having a first compartment enclosure and a second compartment enclosure disposed between the cover and the base;
    a plurality of partition walls arranged within the first compartment enclosure;
    a plurality of partition walls arranged within the second compartment enclosure;
    a gear train assembly positioned within the partition walls of the first compartment enclosure of the housing;
    a direct current motor connected to the gear train and positioned within the partition walls of the first compartment enclosure of the housing;
    a power source electrically connected to the motor, wherein the power source is positioned within the second compartment enclosure of the housing separate from the gear train assembly and motor positioned within the first compartment enclosure of the housing.

15. The compact gear motor assembly of claim 14, wherein the plurality of partition walls within the first compartment enclosure form a securing receptacle.

16. The compact gear motor assembly of claim 15, wherein the plurality of partition walls in the first compartment enclosure secure the gear train and motor within the securing receptacle without fasteners.

17. The compact gear motor assembly of claim 16, wherein a first receptacle surrounds the gear train, and a second receptacle surrounds the motor separate from the gear train.

18. The compact gear motor assembly of claim 17, wherein the plurality of partition walls in the second compartment enclosure secure the power source without fasteners.

19. The compact gear motor assembly of claim 14, wherein the plurality of partition walls within the second compartment enclosure form a securing receptacle.

20. A compact gear motor assembly comprising:
    a housing having a first compartment and a second compartment;
    a gear train assembly positioned within the first compartment of the housing;
    a direct current motor connected to the gear train and positioned within the first compartment of the housing; and
    a power source electrically connected to the motor, wherein the power source is positioned within the second compartment of the housing separate from the gear train assembly and motor combination positioned within the first compartment of the housing, wherein the housing has a base and an outer wall extending around a perimeter of the base forming an enclosure of the first compartment,
wherein the first compartment includes a plurality of partition walls disposed on an interior surface of the base,
wherein the partition walls form a plurality of receptacles within the first compartment, and
wherein the gear train is positioned within one receptacle of the first compartment and the motor is positioned within a second receptacle of the first compartment.

* * * * *